US007376924B2

(12) United States Patent
Curtin et al.

(10) Patent No.: US 7,376,924 B2
(45) Date of Patent: May 20, 2008

(54) METHODS FOR PLACEMENT WHICH MAINTAIN OPTIMIZED BEHAVIOR, WHILE IMPROVING WIREABILITY POTENTIAL

(75) Inventors: James J. Curtin, Fishkill, NY (US); Jose L. Neves, Poughkeepsie, NY (US); Douglas S. Search, Red Hook, NY (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 11/180,740

(22) Filed: Jul. 13, 2005

(65) Prior Publication Data

US 2006/0010413 A1    Jan. 12, 2006

Related U.S. Application Data

(63) Continuation-in-part of application No. 11/129,785, filed on May 16, 2005, now Pat. No. 7,305,644, and a continuation-in-part of application No. 11/129,784, filed on May 16, 2005, now Pat. No. 7,356,793, and a continuation-in-part of application No. 11/129,786, filed on May 16, 2005, now Pat. No. 7,290,233, and a continuation-in-part of application No. 10/890,463, filed on Jul. 12, 2004, now Pat. No. 7,120,888.

(51) Int. Cl.
   *G06F 17/50* (2006.01)

(52) U.S. Cl. .............................. 716/10; 716/9; 716/12; 716/13; 716/5

(58) Field of Classification Search .................. 716/10, 716/9, 12, 13, 5
See application file for complete search history.

(56) References Cited

U.S. PATENT DOCUMENTS

| 5,218,551 | A | * | 6/1993 | Agrawal et al. | 716/10 |
| 5,237,514 | A | * | 8/1993 | Curtin | 716/10 |
| 5,251,147 | A | * | 10/1993 | Finnerty | 716/6 |
| 5,521,837 | A | * | 5/1996 | Frankle et al. | 716/10 |
| 5,666,290 | A | * | 9/1997 | Li et al. | 716/8 |
| RE35,671 | E | * | 11/1997 | Hartoog | 716/12 |
| 6,086,631 | A | * | 7/2000 | Chaudhary et al. | 716/16 |
| 6,480,991 | B1 | * | 11/2002 | Cho et al. | 716/8 |
| 6,493,854 | B1 | * | 12/2002 | Chowdhury et al. | 716/6 |
| 6,601,226 | B1 | * | 7/2003 | Hill et al. | 716/10 |
| 6,757,877 | B2 | * | 6/2004 | Stenberg et al. | 716/6 |
| 6,836,753 | B1 | * | 12/2004 | Silve | 703/2 |

(Continued)

OTHER PUBLICATIONS

Ren et al., "Sensitivity Guided Net Weighting for Placement-Driven Synthesis", IEEE Transactions on Computer-Aided Design of Integrated Circuits and Systems, vol. 24, No. 5, May 2005, pp. 711-721.*

*Primary Examiner*—Phallaka Kik
(74) *Attorney, Agent, or Firm*—Lynn L. Augspurger

(57) ABSTRACT

A method for determining placement of circuitry during integrated circuit design is presented. The method includes accessing a net list identifying circuitry connections. A plurality of individual net weights are assigned to nets in timing paths within the net list. A composite net weight is determined for said timing paths, the composite net weight being in response to the plurality of individual net weights. Concurrently therewith it is advantageous to utilize our new method of improvements of concurrently proceeding to improve wireability of said design by additional timing optimization and net weight mapping modification steps.

8 Claims, 15 Drawing Sheets

U.S. PATENT DOCUMENTS

| | | | |
|---|---|---|---|
| 7,120,888 B2 * | 10/2006 | Curtin et al. | 716/10 |
| 7,207,020 B1 * | 4/2007 | Fung et al. | 716/6 |
| 7,257,795 B1 * | 8/2007 | Fung et al. | 716/12 |
| 7,308,664 B1 * | 12/2007 | Fung et al. | 716/6 |
| 2001/0010090 A1 * | 7/2001 | Boyle et al. | 716/2 |
| 2003/0005398 A1 * | 1/2003 | Cho et al. | 716/8 |
| 2006/0010411 A1 * | 1/2006 | Curtin et al. | 716/6 |
| 2006/0010413 A1 * | 1/2006 | Curtin et al. | 716/9 |
| 2006/0010415 A1 * | 1/2006 | Curtin et al. | 716/10 |
| 2006/0015836 A1 * | 1/2006 | Curtin et al. | 716/10 |
| 2006/0095879 A1 * | 5/2006 | Brahme et al. | 716/6 |
| 2006/0277515 A1 * | 12/2006 | Curtin et al. | 716/10 |

* cited by examiner

TIMING DRIVEN PLACEMENT
CONSTANT NET WEIGHT FOR POSITIVE SLACK NETS
INSURES NO DISCRIMINATION AMONG THOSE NETS!

POSITIVE SLACK NET GROUP DISRIMINATION
(NEGATIVE SLACK 'COMPETITIVE' & 'NON-COMPETITIVE')

——————— NEGATIVE SLACK NET
— 1 — LEVEL 1 CONNECTIVITY [POSITIVE SLACK NET]
— 2 — LEVEL 2 CONNECTIVITY [POSITIVE SLACK NET]
-------- REMOTE CONNECTIVITY [POSITIVE SLACK NET]

TDP POSITIVE SLACK NETWEIGHT FUNCTIONS
*COMPETITIVE & NON-COMPETITIVE*

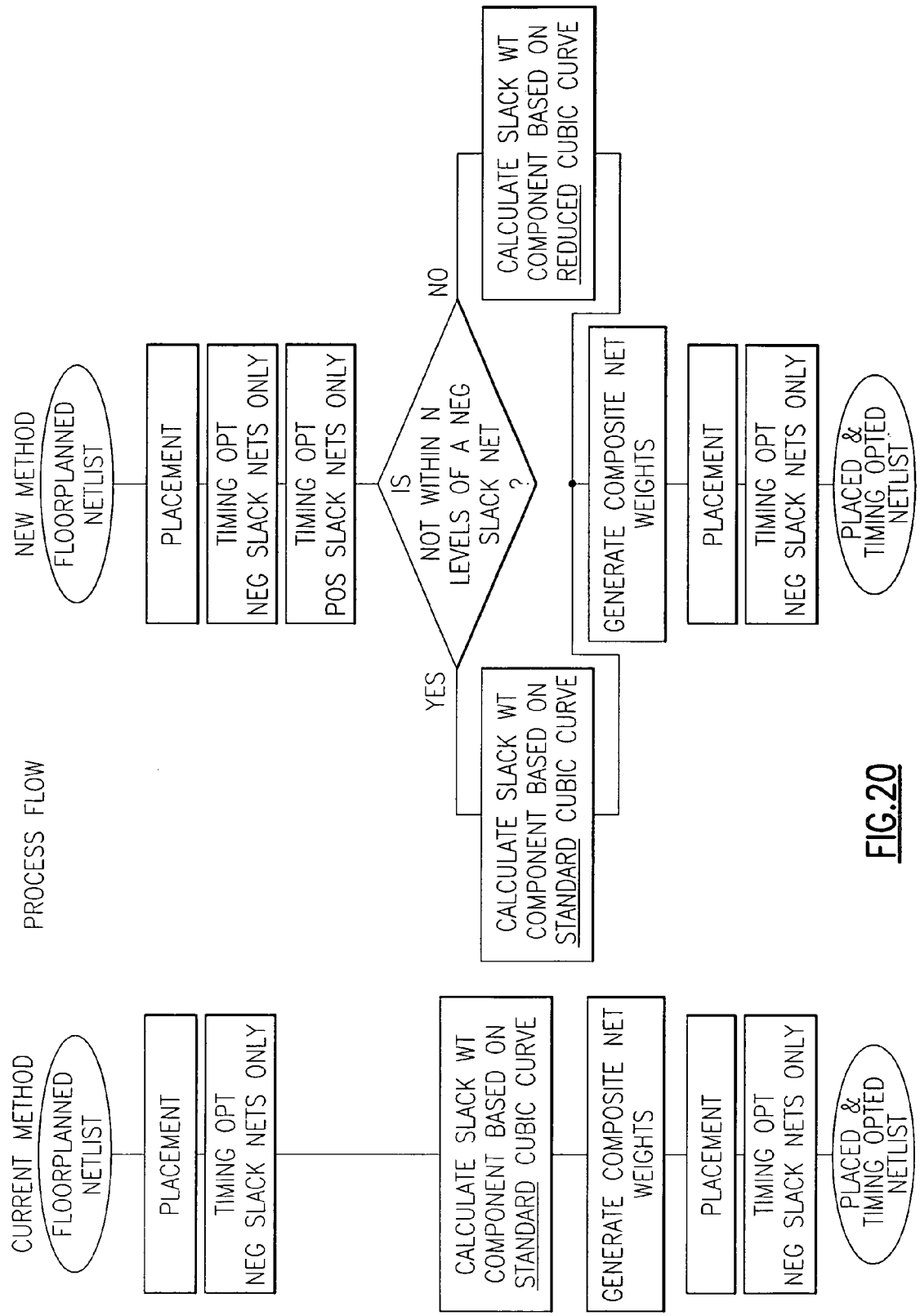

US 7,376,924 B2

METHODS FOR PLACEMENT WHICH MAINTAIN OPTIMIZED BEHAVIOR, WHILE IMPROVING WIREABILITY POTENTIAL

CROSS-REFERENCE TO RELATED APPLICATIONS

This application is a Continuation in Part of and contains subject matter which is related to the subject matter of the following applications, each of which is assigned to the same assignee as this application, International Business Machines Corporation of Armonk, N.Y. Each of the above listed applications is hereby incorporated herein by reference in its entirety:

"Method, system and storage medium for determining circuit placement" Filed Jul. 12, 2004 U.S. Ser. No. 10/890,463 by Curtin et al., now U.S. Pat. No. 7,120,888, "Negative Slack Recoverability Factor—A new net weight to enhance timing closure behavior" U.S. Ser. No. 11/129,785, filed May 16, 2005, by Curtin et al., now U.S. Pat. No. 7,305,644, "Genie: A method for classification and display of negative slack timing test failures" U.S. Ser. No. 11/129,784, filed May 16, 2005 by McIlvain et al.

"A method for netlist path characteristics extraction" U.S. Ser. No. 11/129,786 filed May 16, 2005 by Raphy et al., now U.S. Pat. No. 7,290,233.

Each of the above listed applications is hereby incorporated herein by reference in its entirety:

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to circuit placement and particularly to methods for producing optimal timing and improved wireability when determining circuit placement.

2. Description of Background

Before our invention of methods for combining improved timing with wireability, we developed in particular to circuit placement to improve initial placement of circuits and timing driven placement of circuits which we will describe herein. Chip design is a multi-variate design optimization problem. To enable ASIC and semi-custom chip designs to meet their design targets, a number of different design resources (architecture choices, logic synthesis, chip floorplanning, automated placement, circuit power level selection, buffer insertion, timing optimization logic transforms, etc) are brought to bear and expended in a sequence of design optimization steps and iterative feedback loops to achieve design closure.

The traditional methodology approach to chip design optimization and target convergence has involved an insular sequential application of design resources directed to achieve the greatest immediate improvement in the design state. Thus, design resources are applied in an amount and in an order that only marginally accounts for the interactions among those design resources. Depending on their nature, these interactions can promote or inhibit the convergence of the chip design to its design targets.

With increasing integration levels and signal frequencies, the interactions among design resources have become more significant. Designing future chips without regard to the synergistic application of design resources, will become an increasingly frustrating endeavor. Chip design schedules will lengthen, and some design targets will be regarded as unachievable even though a solution may exist. Thus, improvement is needed in the processes for chip design.

BRIEF SUMMARY OF THE INVENTION

Exemplary embodiments of the invention include a method which can be provided as a described service for determining placement of circuitry during integrated circuit design which we developed in particular to circuit placement to improve initial placement of circuits and timing driven placement of circuits which we will describe herein. The method includes accessing a net list identifying circuitry connections. A plurality of individual net weights are assigned to nets within the net list, the individual net weights being valid irrespective of physical design parameters. A composite net weight is determined for the nets in timing paths, the composite net weight being in response to the plurality of individual net weights. Concurrently therewith it is advantageous to utilize our new method of improvements of concurrently proceeding to improve wireability of said design by applying additional timing optimization steps and net weight mapping modifications to selected paths and nets in the design. Placement of the circuitry is determined in response to the composite net weight. Other embodiments include a computer program and system for implementing the method.

Additional exemplary embodiments of the present invention include a method for determining placement of circuitry during integrated circuit design. The method includes accessing a net list including circuitry connections. A post-placement slack net weight is assigned to timing paths within the net list. The post-placement slack net weight is proportional to a negative slack value increasing with increasing negative slack, and the slack net weight is inversely proportional to a positive slack value decreasing with increasing positive slack. Timing driven placement is performed of said circuitry in response to said slack net weight.

Further exemplary embodiments include a method for determining placement of circuitry during integrated circuit design. The method includes identifying critical paths connecting a source to critical sinks. A plurality of non-critical paths is identified connecting said source to a plurality of non-critical sinks. An isolation buffer is inserted between the source and the non-critical sinks to establish a path between the source and the isolation buffer while maintaining the critical paths between the source and the critical sinks.

There are no known complete solutions to the dual problem of concurrent timing and wireability optimization. Current approaches to the problem involve a mixture of placement controls and guidance mechanisms (occupancy constraints, artificial circuit size amplification, creation of selectively blocked or reserved placement areas etc.) that operate at a systemic level. Although the desire is to produce a selective crafted response in the design, these mechanisms lack the ability to achieve such a tailored and directed result.

Now applicable to the same design as our timing improvements, we describe those methods that we have developed to optimize timing while minimizing risks to wireability.

The referenced applications describe related inventions which produced a more optimal timing Quality of Result (QOR) over the existing prior art. However, the methodology developed with this preferred embodiment explicitly addresses a concurrent goal of minimizing congestion and promoting wireability in a design. This invention provides an additional capability to the methodology described in the previous related inventions continued herein. As described hereinbelow we have provided this methodology with the additional capabilities described herein; substantial improvements in wireability and congestion reduction have been obtained—without affecting the optimal timing results achieved in the methodology of the related invention disclosures. This result has been experimentally verified on recent vintage designs.

System and computer program products corresponding to the above-summarized methods can implement our inventions as described and claimed herein.

TECHNICAL EFFECTS

As a result of the summarized inventions, technically we have achieved a solution which, can be used in conjunction with the related applications describing inventions which can provide a capability to design chips, macros, and cores faster and with a more optimal timing result which maintains a high wireability potential. This capability can be exploited by two semiconductor industry groups. Design Automation Tool Vendors such as Cadence, Magma, Synopsis, Mentor Graphics etc. are among those companies which can offer design tool suites which contain this capability and market the improved timing quality of result and design cycle turn around time advantages these concepts provide. The second industry group is a Design Services group (such as IBM's E & TS group) which can utilize this methodology in their design services (design methodologies and design development cycles). Finally any company which maintains its own in-house design capability can implement these inventions and methods for their own internal designs.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Referring now to the drawings wherein like elements are numbered alike in the several FIGURES:

FIG. 20 illustrates those congestion mitigation steps which can be executed in a revision to the original Pisces methodology.

The detailed description explains the preferred embodiments of the invention, together with advantages and features, by way of example with reference to the drawings.

DETAILED DESCRIPTION OF THE INVENTION

Embodiments of the invention improve circuit placement during integrated circuit design by improving both initial placement and timing driven placement. If the initial placement results in a placement with poor quality, it will misdirect timing-driven placement by means of false or inaccurate net weight priorities. The techniques described herein improve both initial placement and timing driven placement. These techniques may be implemented on a computer executing a computer program for carrying out the processes described herein.

In determining initial placement of circuits, embodiments of the invention use a number of net weights to prioritize paths. Nets weights may be used to characterize the priority of nets and pins and thus the term net weight is not limited to nets, but includes other circuit pin elements. Each of the pre-placement net weights is valid irrespective of physical design parameters of the design (i.e., chip IMAGE and floorplan) so that the use of the net weights to drive initial placement remains valid no matter what the impact of the chip IMAGE and floorplan is on the resulting initial placement. For both initial placement and timing driven placement the net weights are then combined into a composite net weight. Each net has a composite net weight indicating the placement priority of that net. Nets with highest composite net weights are given priority in placement so that the critical timing paths are accommodated.

Figure 1:
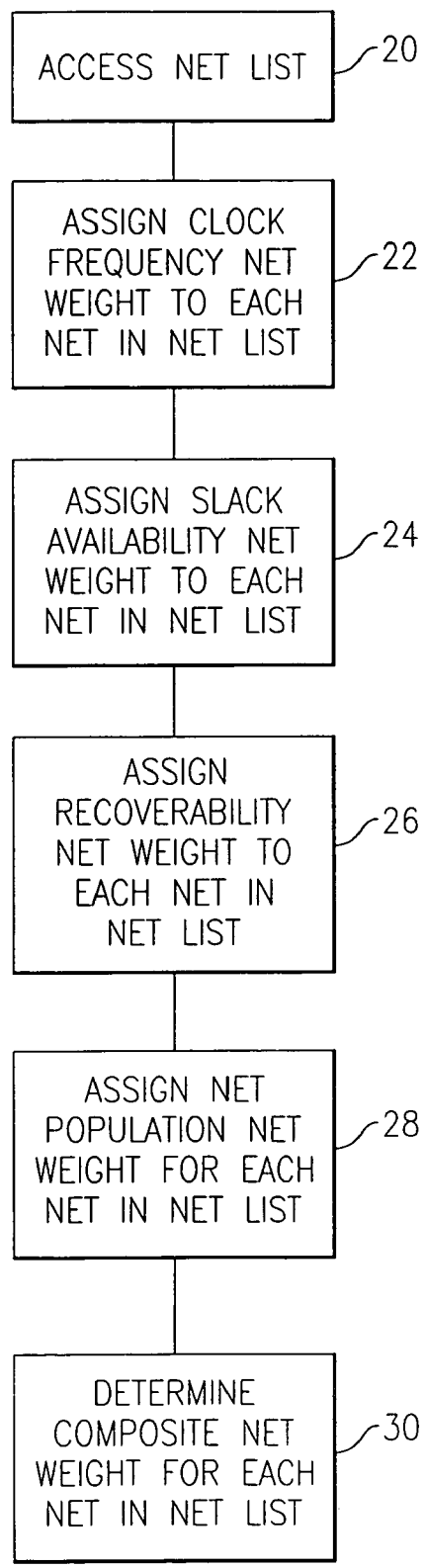
FIG. 1 is a flowchart of an exemplary process for assigning net weights in an embodiment of the invention.

FIG. 1 is a flowchart of a process for assigning net weights to paths prior to initial placement to evaluate path criticality. At step 20, the net list is accessed. The net list contains a list of all circuitry interconnections and clock speeds for each path. For example, the net list may indicate that an output of a gate is captured by a latch at a certain clock frequency.

At step 22, a clock frequency net weight is assigned to nets and pins in paths in the net list. Existing initial placement routines do not consider clock frequency but are currently based on connectivity and circuit block occupation density. In existing routines, clock connections are deliberately ignored and detached during initial placement, so they have no influence on latch placement from either a connectivity or occupation density standpoint. As a result, in existing routines, latch placement is based solely on the data signal stream that the circuitry must process. The other input stream, the clock, is not considered.

By contrast, embodiments of the invention assign a clock frequency net weight to nets and pins in paths during the initial placement process. Clock frequencies place constraints on circuitry. For example, with respect to logic functions, higher frequencies reduce data path latencies, implying more restricted net length and placement area constraints for data path logic. With respect to latch distribution constraints, higher frequencies generally impose reduced clock latency and increased clock signal integrity requirements such as improved slew rate requirements, decreased minimum pulse widths and decreased clock arrival times. The clock frequency net weight is essentially proportional to the clock frequency. Thus, increasing clock frequency results in increased clock frequency net weight for that path. At step 22, each path is assigned a clock frequency net weight based on the associated clock for that path. In one example, the clock frequency net weight may be a linear function based on a constant multiplied by the clock frequency.

At step 24, a slack availability net weight is assigned to each net and pin in the net list. Depending on timing targets and the number and type of circuit blocks in a path, a path may have more or less slack availability. Path delay is a summation of logic block delay and placement related net delay. Subtracting pre-physical design logic block delay from the path delay timing target can give a relative assessment of the remaining path delay available for consumption by placement. This placement-available slack measure can be used to drive initial placement priorities by assigning a slack availability net weight to each net.

The slack availability places constraints on path components. With respect to logic functions, paths with less placement-available slack must complete their connections within a smaller aggregate path net length. With respect to latches, latches define the data path boundaries. Paths with less placement-available slack must also locate their latches closer, often within a smaller area.

Figure 2:
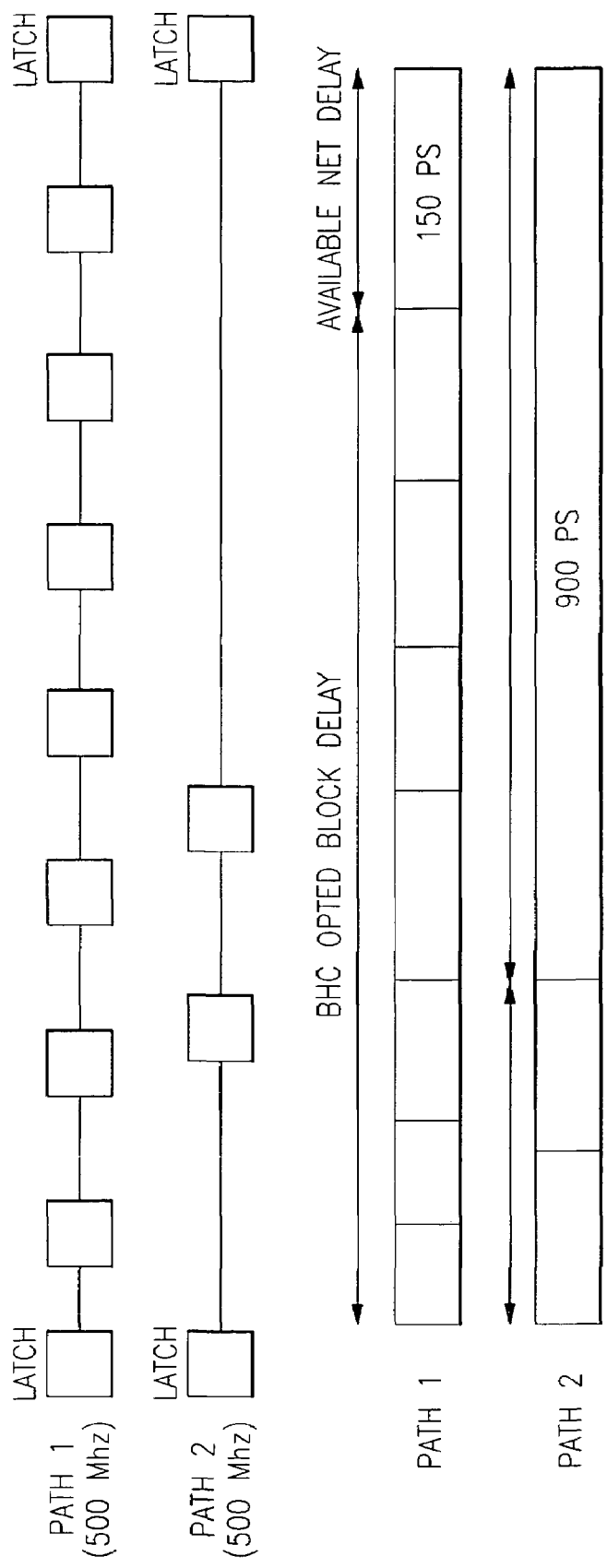
FIG. 2 depicts two paths having different slack availability.

FIG. 2 illustrates two paths shown as path 1 and path 2. Both paths have the same clock frequency, but path 1 has 7 circuit blocks between 2 latches connected by 8 nets. Path 2 has 2 circuit blocks between 2 latches connected by 3 nets. Circuit block delay represents the existing inherent delay associated with circuitry prior to placement. Net delay refers to delay attributable to a timing path that can be adjusted by circuit placement. Thus, the path having the more positive placement available slack is assigned a lower slack availability net weight. Conversely, the path having the less positive placement available slack is assigned a higher slack availability net weight.

At step 26, a recoverability net weight is assigned to each net and pin in the net list. The recoverability net weight is based on the recognition that some paths have components which are not optimizable. For example, certain on-chip delays cannot be altered such as hard macros, RAMs, cores, I/O books, etc. Off-chip delays also cannot be adjusted using on-chip design adjustments. Recognizing that certain path delay components cannot be optimized reduces the amount of design resource that can be brought to bear on optimizing the path and reduces its convergence potential. In order to compensate for a path's inability to be optimized, a recoverability net weight is assigned to each net in such paths.

Figure 3:
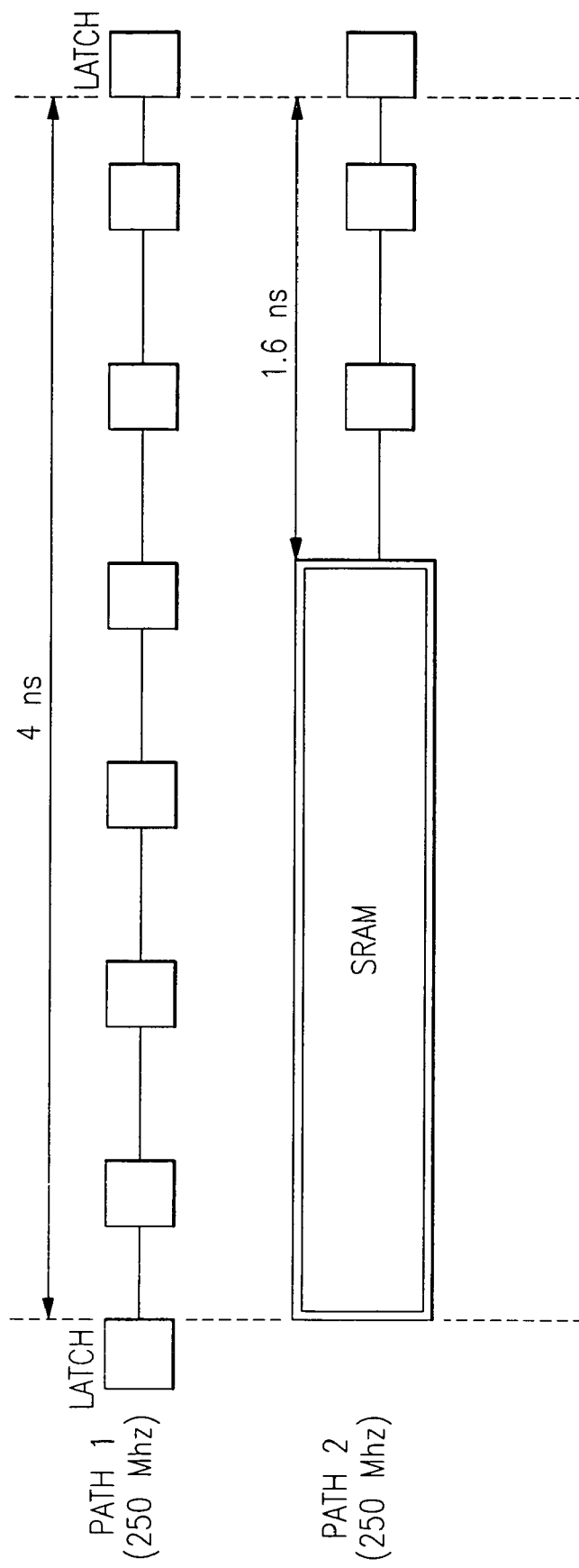
FIG. 3 depicts two paths having different recoverability.

FIG. 3 illustrates two paths having differing amounts of recoverability. Path 1 includes a number of circuits that may be optimized by altering the location of the circuits. Thus, path 1 includes 4 nanoseconds of delay all of which is potentially optimizable by adjusting circuit locations and/or applying optimization techniques. Path 2 includes an SRAM that has a 2.4 nanosecond non-optimizable access time; and additional circuits with potentially optimizable delay of 1.6 nanoseconds. Thus, path 2 has 2.4 nanoseconds of unoptimizable delay and 1.6 nanoseconds of potentially optimizable delay.

Figure 4:
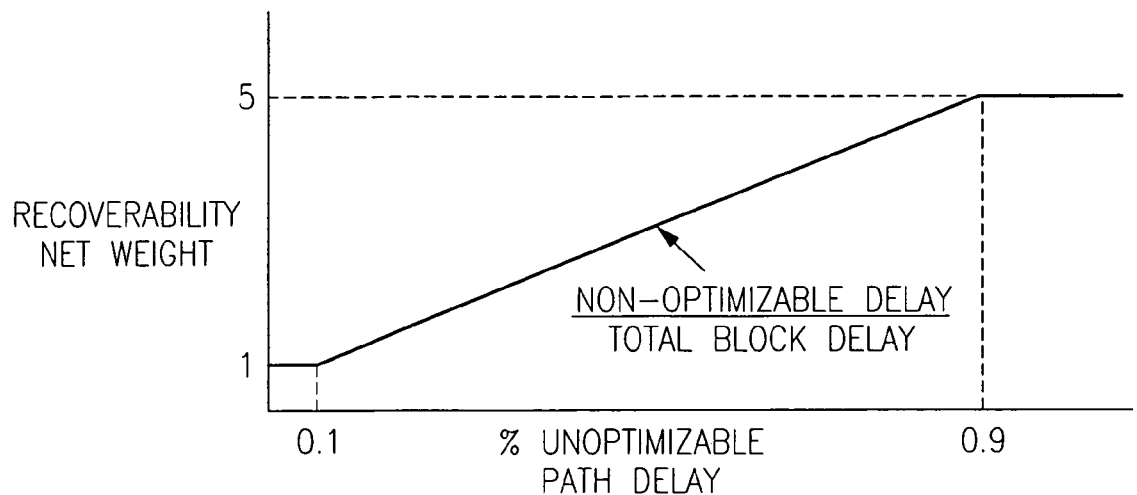
FIG. 4 depicts a plot of an exemplary recoverability net weight.

FIG. 4 depicts an exemplary function for determining a recoverability net weight for nets in a path. The function uses the ratio of non-optimizable delay to total path delay to define a recoverability net weight. In the example shown in FIG. 4, the recoverability net weight ranges from 1 to 5 as the percent of unoptimizable path delay increases.

At step 28, a net population net weight is assigned to each net and pin in the net list. The net population net weight is based on the number of nets within a path. Paths may be generally defined as the overall routes between primary inputs and latches, primary outputs and latches, and between two latches. A net is generally an entity that connects a logic block to other logic blocks.

In current practice, the slack of a path is assigned to each net within that path. Net weights are calculated for each net based on the slack assigned to the net. If a set of paths have the same slack, each net in the set of paths is assigned the same slack value and receives the same net weight. Assigning equal net weights to a set of nets implies equal emphasis in placement for each net in the set of nets. If different paths are composed of unequal numbers of nets, after placement some paths will have greater path delays than others even though their initial slack values and individual net placement emphases were the same. The path delay differences result because path delay is a function of the summation of net delays in the path. For equal length nets, paths composed of a greater number of nets, will have a greater delay. To compensate for this effect, embodiments of the invention use net population net weights to account for the net population differences among paths.

Among the effects of the net population differences are natural physical expansion of a path as a function of the number of nets in the path. This expansion behavior is a consequence of the equilibrium point solution of the quadratic placement algorithm.

Another effect of net population differences is based on fan out. Based on average fan out statistics for a chip, each net in a path interacts with other logic circuits on the chip.

For an average fan out of 3, each net in a path will engage 2 other logic blocks not in the path being considered. If a path has 12 nets in it, it engages on average 24 extraneous logic blocks not in the path. If a path is composed of 3 nets, it interacts with only 6 extraneous blocks. Placement is a competition among nets. The greater the number of nets in a path, the greater the cumulative fan out of a path's nets. The more logic the path has to compete with, the more interdependencies must be dealt with in trying to optimize the path.

Still another effect of net population differences is based on path net delay. The probability of a path achieving a timing target will be directly related to the amount of placement design freedom each net in the path has. The smaller the average path allotted net delay, the smaller the average placement design freedom, and the lower the probability that a summation of the net delays in a path will remain within the path's timing constraint.

Figure 5:
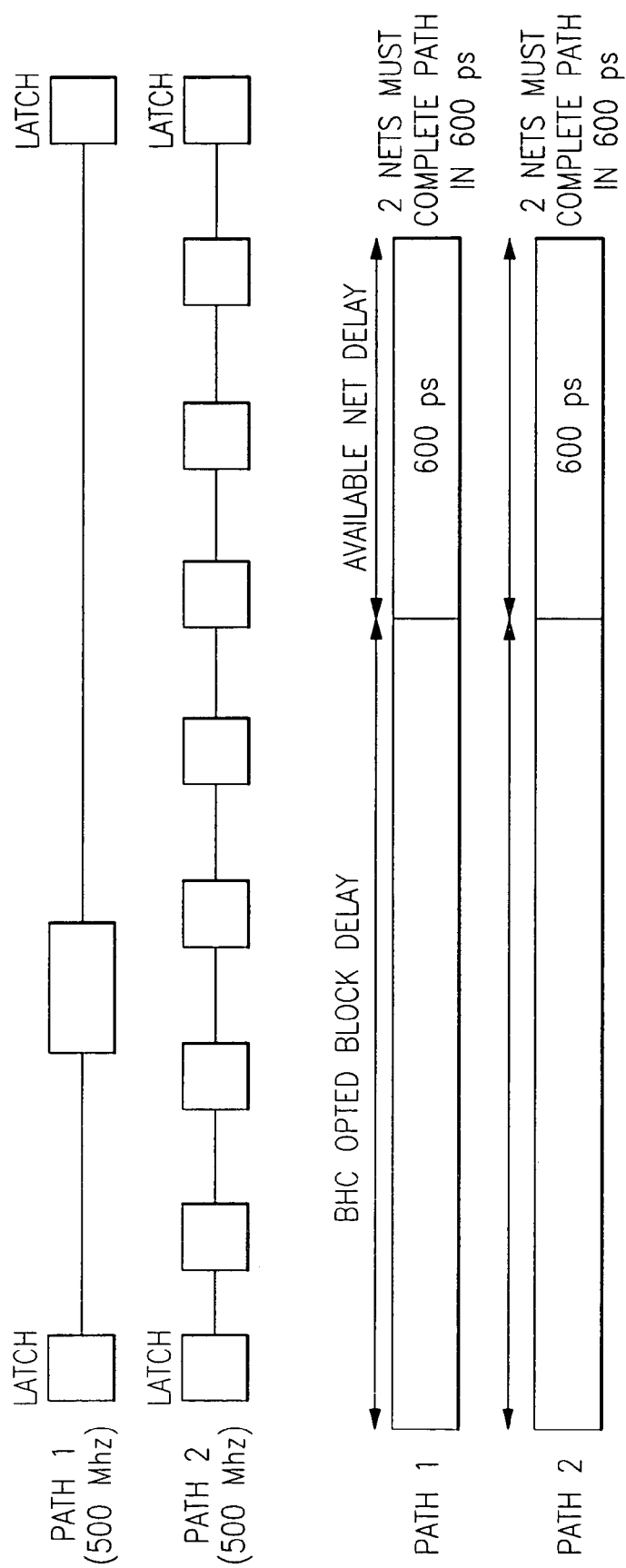
FIG. 5 depicts two paths having different net populations.

FIG. 5 depicts two paths having the same clock frequency and a different number of nets. Path 1 includes 2 nets while path 2 includes 8 nets. The available net delay is 600 picoseconds for each path, but path 2 requires that 8 nets complete within the 600 picoseconds. For path 1, only 2 nets must complete within the 600 picoseconds.

Figure 6:
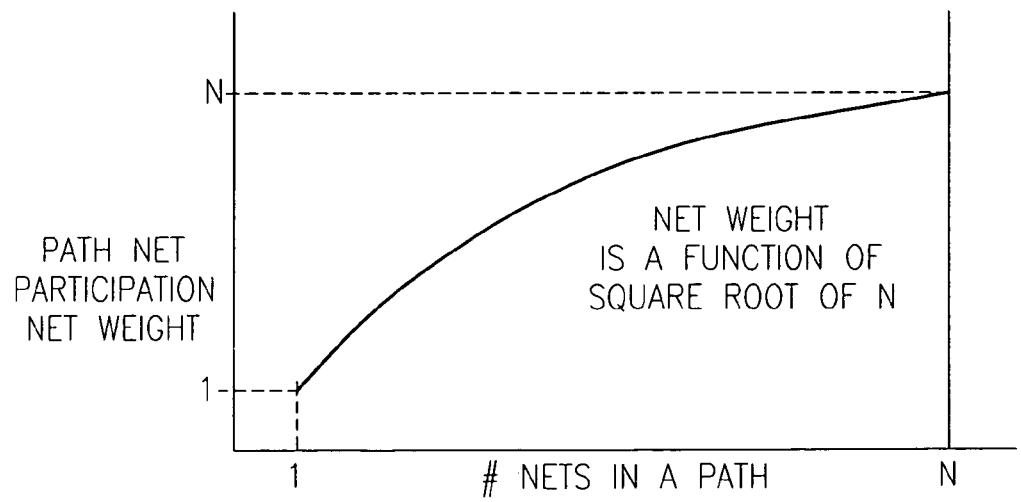
FIG. 6 depicts a plot of an exemplary net population net weight.

Given these effects of additional nets in the path, a net population net weight is used that is proportional to the number of nets in the path. In embodiments of the invention, the net population net weight is based on the square root of the number of nets in the path. For example, FIG. 6 shows a plot of a path net population net weight versus the number of nets in a path. As the number of nets in the path increases, the net population net weight also increases.

Once the clock frequency net weight, slack availability net weight, recoverability net weight and net population net weight are determined, the composite net weight is determined for each net at step 30. The composite net weight may be computed based on one or all of the individual net weights. As an example, the individual net weights may be multiplied to define the composite net weight. One or more of the individual net weights may be normalized or the composite weight may be normalized.

Once the composite weight is determined for the nets in the net list, the initial placement of circuitry may be prioritized. The nets having the higher composite net weights have higher placement priority.

Once the initial placement is performed, the next stage of the chip design process is timing driven placement. During timing driven placement, the composite net weights may be calculated based on post initial placement timing and may be used to characterize placement priority. Our preferred embodiment of the invention for timing driven placement involves use of the individual net weights mentioned previously—augmented by an additional net weight called the Negative Slack Recoverability Factor.

The details of NSRF have been described in the priority application "Negative Slack Recoverability Factor—A new net weight to enhance timing closure behavior" U.S. Ser. No. 11/129,785, filed May 16, 2005. by Curtin et al., which is incorporated fully herein by reference.

Paths may have positive slack or negative slack. Positive slack indicates that the path completes its processing within the allocated time. Negative slack indicates that the path cannot complete its processing within the required timing. One goal of circuit placement is to have no paths with negative slack.

Figure 7:
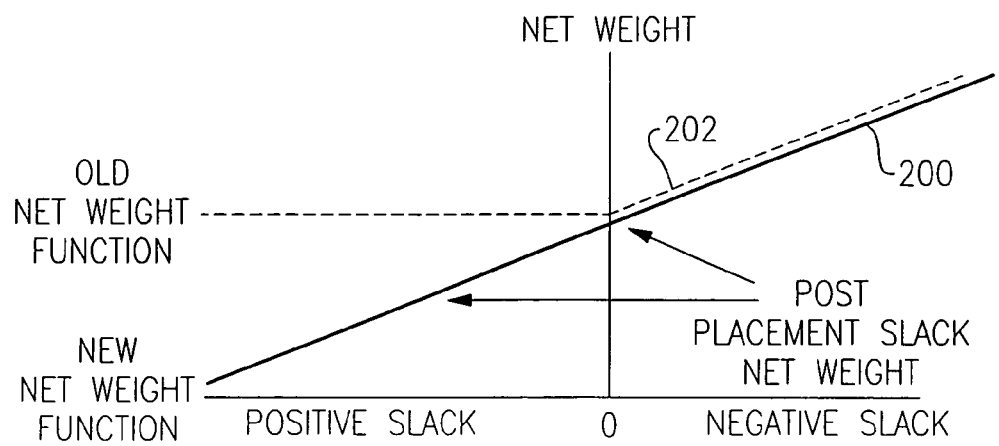
FIG. 7 depicts a plot of an exemplary slack net weight.

The management of positive slack is another feature used in embodiments of the invention. Slack is the difference between required arrival time of a signal in a path and the actual arrival time of the signal. Embodiments of the invention assign a slack net weight to paths dependent on the amount of positive or negative slack in that path. FIG. 7 depicts an exemplary slack weight that varies with the slack as indicated by line 200. The conventional slack net weight is also depicted in FIG. 7 as dashed line 202. The conventional slack weight treated all positive slack paths the same. That is, whether a path had 100 extra picoseconds or 1000 extra picoseconds, the slack net weight was the same.

The slack net weight function 200 adjusts the slack net weight in response to the amount of positive slack in an inversely proportional manner. That is, as positive slack increases the slack net weight decreases. For negative slack, the slack net weight increases with increased negative slack. The slack net weight is then used as a factor in timing driven placement. During timing driven placement, circuit placement is adjusted based on the net weights described above with reference to FIG. 1 and the slack net weight of FIG. 7.

Our preferred embodiment of the positive slack net weight mapping function is illustrated in FIGS. 12, 14, 15, 16, 17, and requires that the mapping function's second derivative be minimally a positive function of path delay (i.e. reduced positive slack).

Figure 8A:
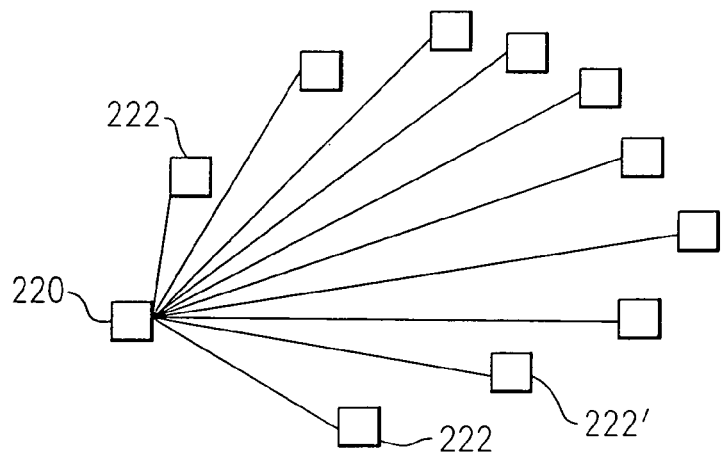
FIGS. 8A and 8B illustrate buffer insertion for isolating critical and non-critical nets.

The above described techniques use net weights to improve initial placement and timing driven placement. In other embodiments of the invention, the net list is modified to improve both initial placement and timing driven placement. In embodiments of the invention, buffers are inserted in the net list to provide isolation of critical sinks from non-critical sinks. FIG. 8A shows a source 220 connected to ten sinks 222. The path to critical sink 222' is a critical path. The RC load of all ten sinks prevents efficient signal timing to the critical path.

Multi-drop nets with a mix of critical and non-critical sinks such as that in FIG. 8A pose a dilemma. Assigning a high priority to all sinks in the net based on the criticality of the most critical sink will cause all of the sinks in the net to be considered critical. This is not desirable because the non-critical sinks' placements may exert an influence on other critical paths not related to the multi-drop net. This interdependency may cause these other critical paths to lengthen unnecessarily due to the excessive priority emphasis of the non-critical sinks. Assigning a low priority to all the sinks of the net based on the predominant slack value of the sinks will cause the critical path through the critical sink to be under emphasized during placement, lengthening this critical path.

In conventional methods, all sinks of a given net share a net weight based on the most critical path passing through the net. The most critical sink's priority is amplified by an additional factor; the creation of a temporary point to point connection, or net, between the driver book/pin and the most critical sink book/pin. This connection is called an attraction.

This attraction increases the emphasis on pulling the most critical sink closer to the net's driver book during placement. This attraction is invoked when the most critical sink's slack has a high variance from the net's sink group nominal slack value. This results in number of disadvantages. The critical path segment passing through the net is subjected to, and delayed by, the full electrical parasitic load resulting from the cumulative capacitive load caused by all the sink pins in the net; and the RC delay caused by the amount of wire required to connect to all of the sinks in the net. Furthermore, other critical paths, which are indirectly connected to this critical path through interactions with the non-critical sinks of the net, can be forced to compete directly with this critical path, because the non-critical sinks are made to appear critical by the sharing of a net weight determined by the most critical sink.

Figure 8B:
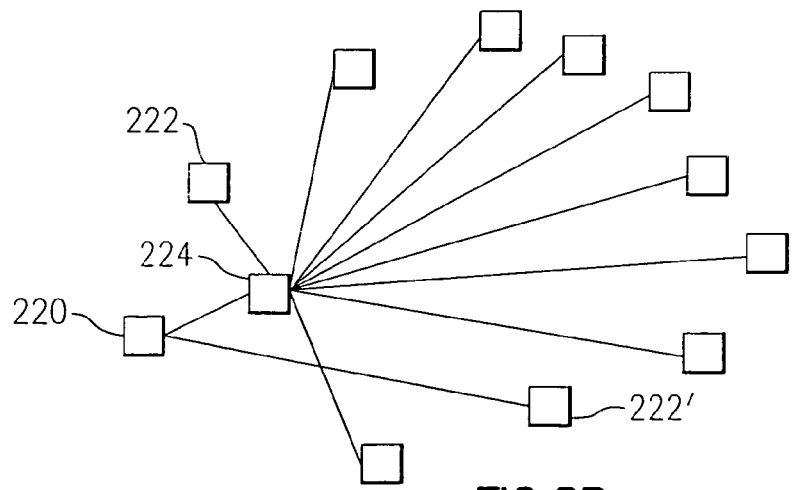

FIG. 8B depicts one technique to isolate critical sinks from non-critical sinks in embodiments of the invention. As shown in FIG. 8B, a buffer 224 is positioned between the source 220 and the non-critical sinks 222. This provides two direct connections to the source 220, one between source 220 and buffer 224 for the non-critical sinks and one between source 220 and critical sink 222'. This improves the timing to the critical sink 222' and also facilitates timing of other critical paths that may be influenced by placement of non-critical sinks. As noted above, the net list is modified to include the buffer 224 as a new component.

The imposition of isolation buffer 224 between the source 220 and the non-critical sinks 222 of the net provides several advantages. The critical path segment passing through the net is subjected to, and delayed by, the electrical parasitic load caused by the capacitive load produced by only two sink pins in the net, namely the most critical sink, which is in the critical path; and the isolation buffer sink. Further, the RC delay caused by only the amount of wire required to connect to the isolation buffer and the wire required by the critical path segment itself. The isolation buffer adds delay to the delay paths of the non-critical sinks, but this is not a problem. These paths are by definition non-critical, and can absorb a great deal of extra time delay before becoming timing violations. Because no critical sinks are part of the isolation buffer net, the net and its sinks can expand significantly. This expansion freedom allows other critical paths to optimize their timing with minimal impact on the critical path which was isolated by the isolation buffer. This effect of reducing the interaction probability among multiple critical paths, by means of isolation buffer insertion, has cumulative benefit as more and more critical paths are isolated. The freedom to optimize placement grows as each critical path to critical path interaction is minimized.

In determining which sinks 222 receive a direct connection to the source 220, the criticality of each sink is compared to a criticality threshold. This criticality threshold may be based on a percentage (e.g. 50%) of the highest criticality sink. If a sink has a criticality greater than the criticality threshold, then a direct connection is made from the source to that sink.

When adding direct connections to a source, factors such as fan out are addressed. In conventional routines, nets with a high fan out (e.g., over 100 nets) were ignored because the processing needed is intense. Embodiments of the invention determine if any critical sinks exist in network having high fan out. If no critical sinks are present, then the entire network is ignored with respect to making direct connections to a source. If critical sinks do exist, then direct connections are made from the critical sinks to the source, and the remaining non-critical sinks are ignored. The critical sinks may be determined by comparing sink criticality to a criticality threshold.

Figure 9:
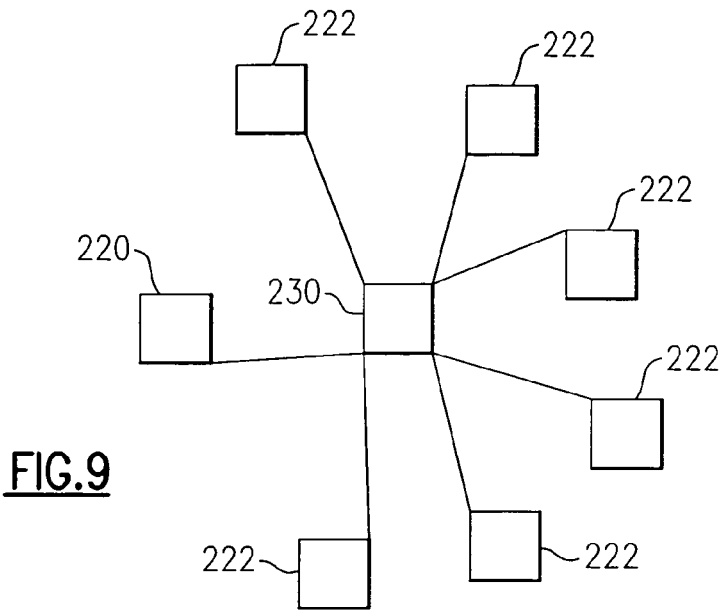
FIG. 9 illustrates a technique for achieving net equilibrium.

A feature that may be used in connecting sinks directly to a source is determining an equilibrium point for the connecting a driver to the sinks. This process is illustrated in FIG. 9 where a source 220 is to be connected to a number of sinks 222. To mimic the behavior of a clique model for the net, a book 230 is temporarily assigned as a connection point for all the sinks 222 and the source 220. The nets between the temporary book 230 and source 220 and temporary book 230 and sinks 222 are balanced to achieve equilibrium so that each circuit connected to the net has a placement priority proportional to the slack requirement.

We have described a current method of implementation of our "method, system and storage medium for determining circuit placement" as described in the related application by that name," filed Jul. 12, 2004, but concurrently therewith it is advantageous to utilize our new method of improvements of concurrently proceeding to improve wireability of said design by additional timing optimization and net weight mapping modification steps which we will describe.

Turning now to our improvements in the drawings in greater detail, in order to achieve ASIC chip/core/macro design closure two major objectives must be met. The design must achieve timing closure for all of its data paths, and all of the design's net connections must be wireable. In order to accomplish these two goals designers typically must drive design development evolution to optimize timing while minimizing risks to wireability. Often conceptual strategies and techniques which promote achievement of one of these goals will hinder accomplishment of the other goal. Spreading circuit placements apart in order to promote wireability will add delay to data paths and adversely affect timing closure. Compressing circuit placements to foster better data path timing tends to increase area pin density and increase congestion—reducing the probability of achieving full wireability for the design.

The ability to control placement surgically so that congestion mitigation is promoted without sacrificing optimal timing potentialities is of great value. This invention addresses that requirement.

As we have said, there are no known complete solutions to the dual problem of concurrent timing and wireability optimization. Current approaches to the problem involve mechanisms that lack the ability to achieve a tailored and directed result.

Figure 10:
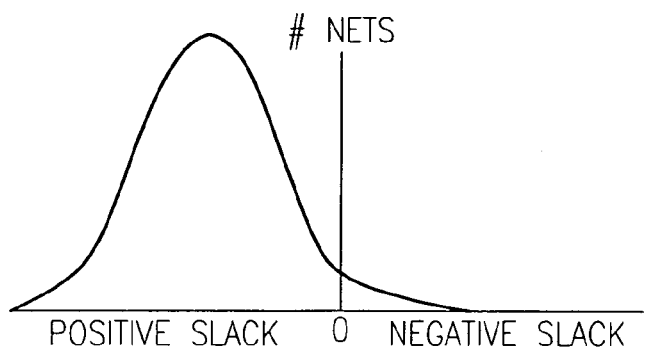
FIG. 10 illustrates one example of today's methods where all positive slack nets receive the same netweight value.
Figure 10:
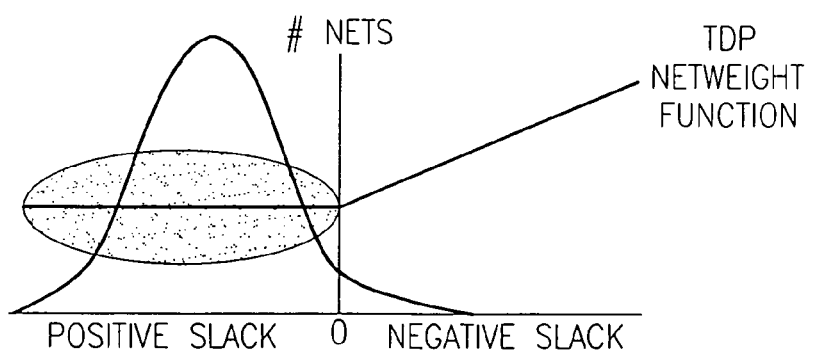

For example, in today's methodologies all positive slack nets receive the same netweight value (FIG. 10). This lack of discrimination among the vast majority of a design's nets facilitates a minimization of total squared wire length. This reduction in wire length enhances wireability potential and promotes a reduced probability of congestion. But it does so at a price. The ability to realize the most optimal timing and achieve design closure is diminished.

Figure 11:
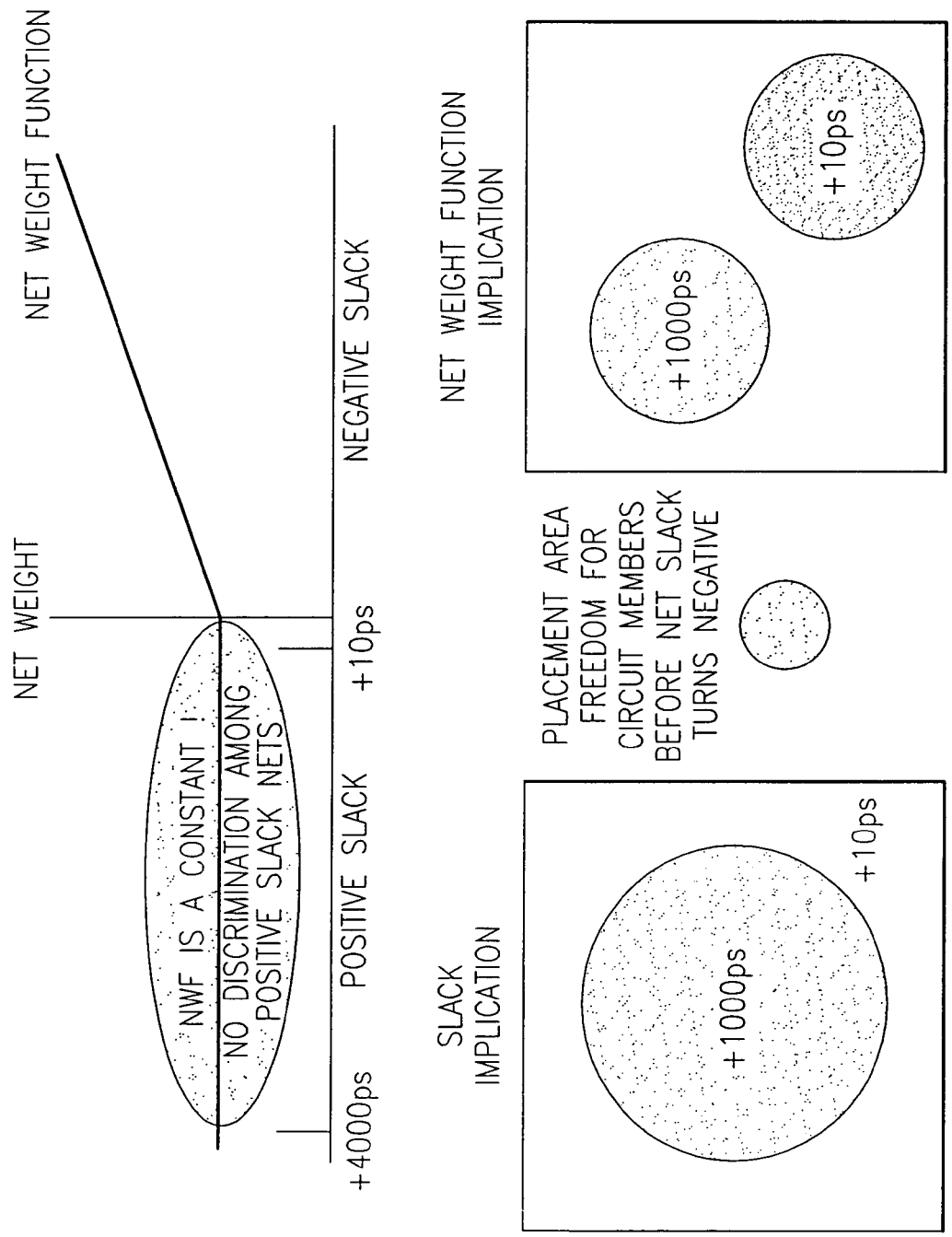
FIG. 11 illustrates that because there is no discrimination among positive slack nets, all positive slack nets receive the same priority for placement

FIG. 11 illustrates that because there is no discrimination among positive slack nets, all positive slack nets receive the same priority for placement. Thus when negative slack nets are influenced (through netweights) to contract; positive slack nets—which must expand to accommodate this contraction—will suffer an increase in their path delay and a reduction in their positive slack margin. Those positive slack nets which have small positive slack values and lie near the zero slack threshold, will have a high probability of 'crossover' as indicated by the differing placement area freedom circles for the +10 ps nets shown in FIG. 11. That is their new placement behavior will change their slack status from marginally positive to negative. In effect they will be changing places with the former negative slack paths that became positive in the new netweight driven placement. The end result of this 'constant' netweight function for positive slack nets is that enhanced wireability is traded for diminished timing optimization capability.

Figure 12:
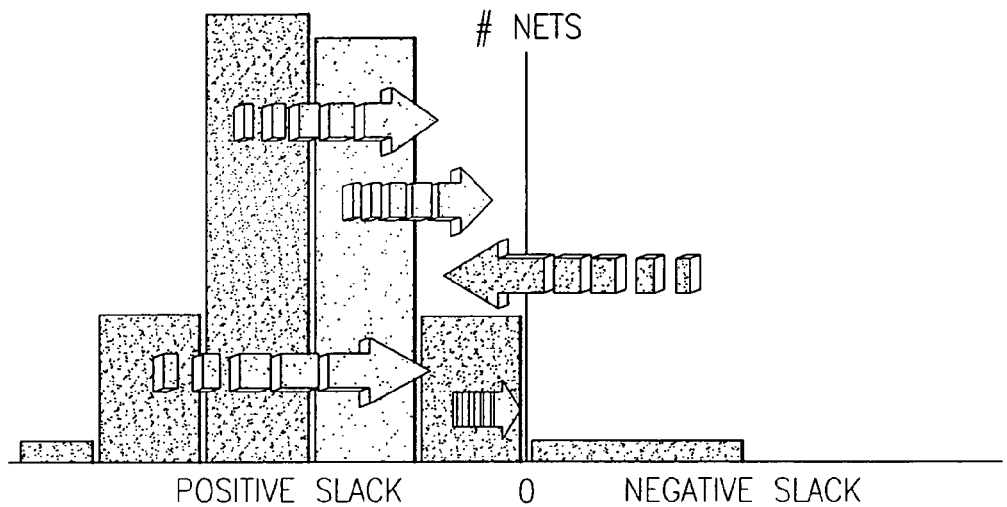
FIG. 12 illustrates our exemplary preferred embodiment of our invention which maintains an optimal timing result but does not promote a reduced congestion environment for improved wireability and minimized coupled noise impacts.
Figure 12:
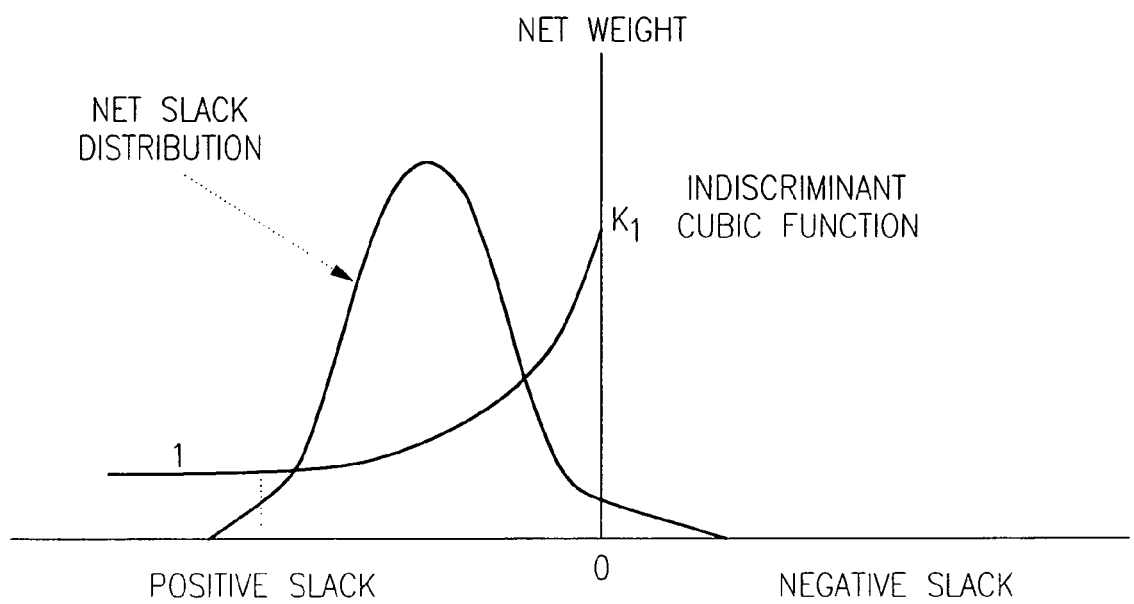

Beginning with FIG. 12 we will examine the method of reducing congestion, and as we have said, the idea of this invention is to maintain an optimal timing result while promoting a reduced congestion environment for improved wireability and minimized coupled noise impacts.

In an ideal scenario, a set of net weights would be applied to the entire netlist for the design which would:

A. Allow all negative slack nets in critical (negative slack) paths to contract sufficiently to achieve timing closure, without causing positive slack nets to expand or enlarge enough to "crossover" the zero slack threshold and become new negative slack nets in new critical (negative slack) paths (FIG. 12).

B. Allow positive slack nets and paths enough expansion freedom and concomitant placement flexibility to amplify the effectiveness of congestion reducing techniques and algorithmic behaviors.

This invention promotes both of the optimum timing closure and wireability goals (A & B) mentioned above by altering the positive slack-to-netweight mapping function (an example of a mapping function, netweight=k(S1−net slack)$^3$ to account for:

1. Potential path slack improvements by means of timing optimization transforms (repower, buffer insertion etc)

2. The variable impact of negative slack path improvements on positive slack paths during replacement—based on the 'logical proximity' of the positive slack path timing segments to the negative slack path segments.

The goal is to promote congestion mitigation by providing the maximal placement flexibility for the positive slack distribution; while maintaining optimal timing closure behavior by controlling (preventing/minimizing) the positive slack distribution's migration into the negative slack domain. All this must be done while recovering enough net delay for existing critical paths to achieve timing closure.

To accomplish these objectives three concepts are applicable:

1. Maintaining optimal timing closure behavior by preventing/minimizing positive slack distribution migration into the negative slack domain (minimize 'crossover').

This involves the institution of a netweight mapping function which increases sharply as the amount of positive slack decreases. To maximize the probability of timing convergence over a plurality of sequential placements using the same slack/netweight mapping function; the function chosen should have the preferred embodiment that the function's second derivative should itself be, at a minimum, a positive function of time as shown in FIG. 12.

One example of a preferred embodiment for a positive slack/netweight mapping would be a cubic function $y=kx^3$ where y is the netweight; x equals some fixed positive slack value S minus the slack ($slk_i$) assigned to the net ($x=S-slk_i$); and k is the maximum netweight for the positive slack distribution applied at the zero slack point.

Figure 13:
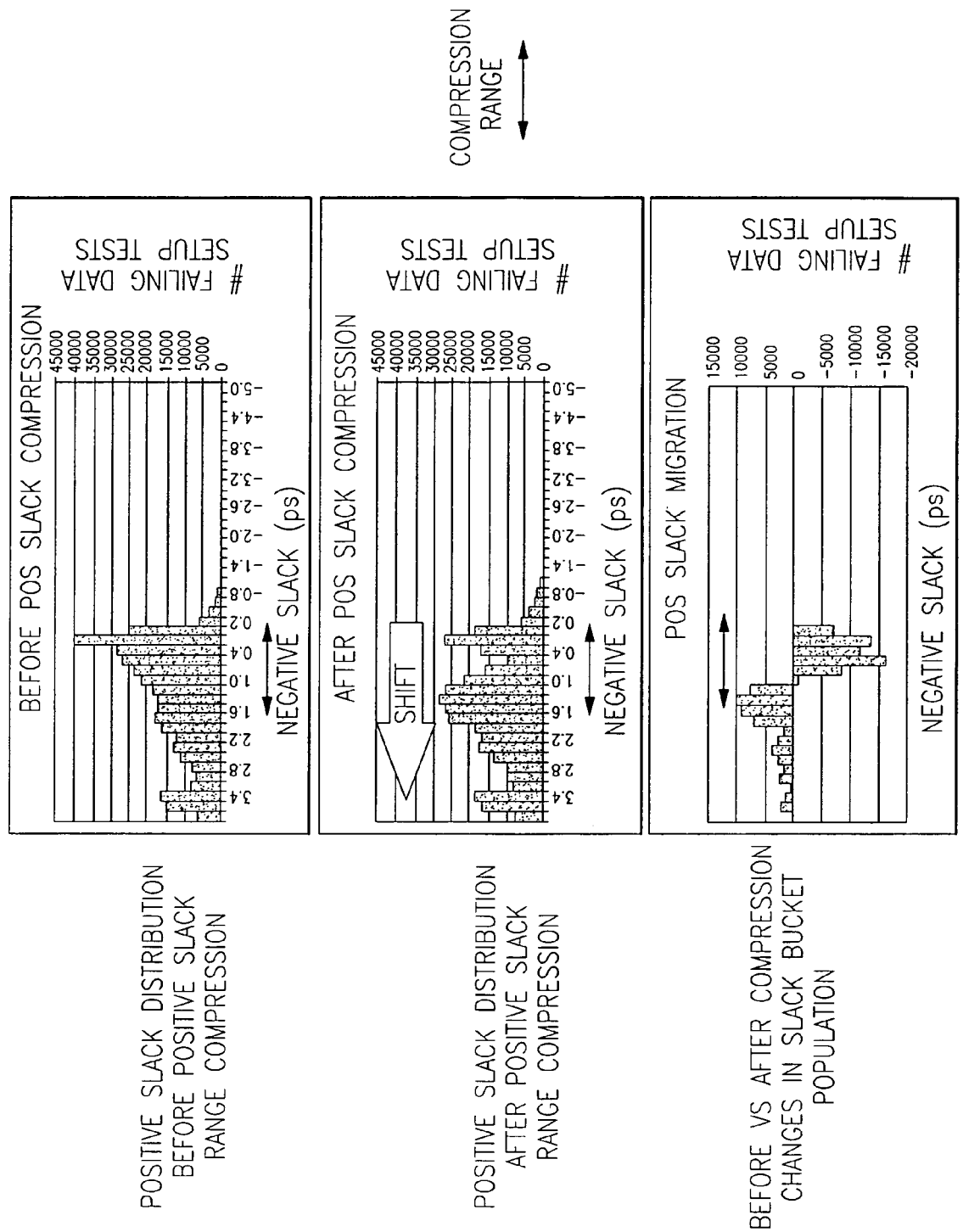
FIG. 13 illustrates an example of the effect the additional timing optimizations (applied within a selected positive slack range) have on the positive slack timing distribution.

2. Promoting congestion mitigation by a 'virtual' timing improvement projection for all positive slack paths within a selected positive slack range This concept embodies the idea of lowering the mapped netweight from the cubic function in #1 by applying a timing optimization algorithm to the nets and paths within a selected positive slack range (FIG. 13).

Figure 14:
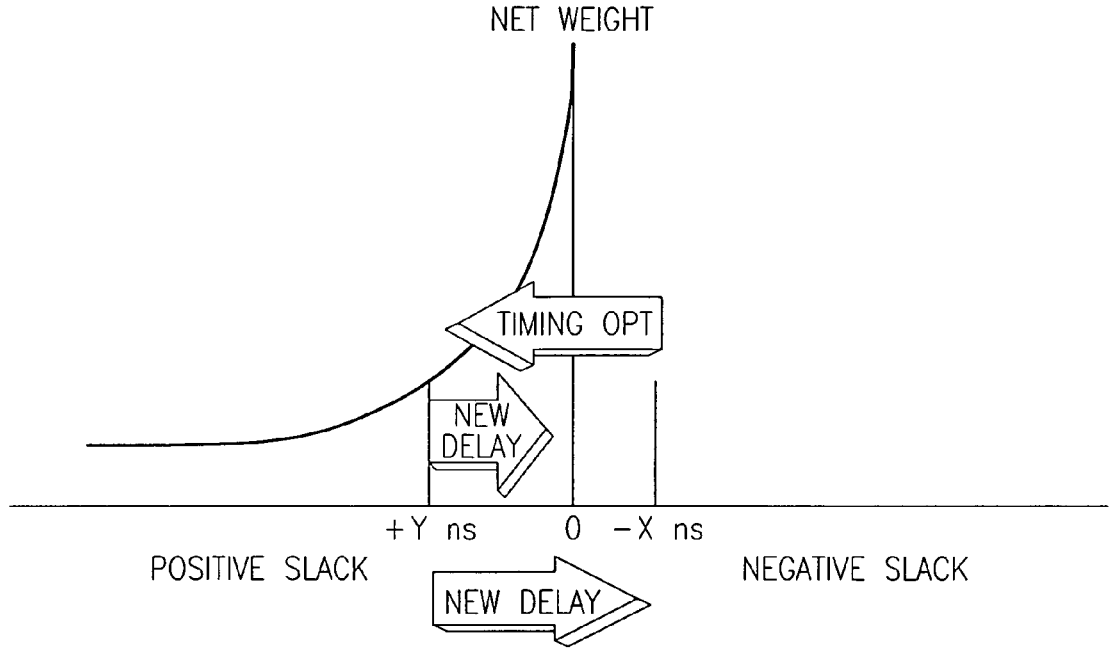
FIG. 14 illustrates the timing improvement will be 'virtual' in the sense that any repowering or buffering required to achieve this timing improvement will never actually be implemented in the design netlist—unless the positive slack nets become negative in the new placement.

This timing improvement will be 'virtual' in the sense that any repowering or buffering required to achieve this timing improvement will never actually be required in the design netlist—unless the positive slack nets become negative in the new placement (FIG. 14).

Figure 15:
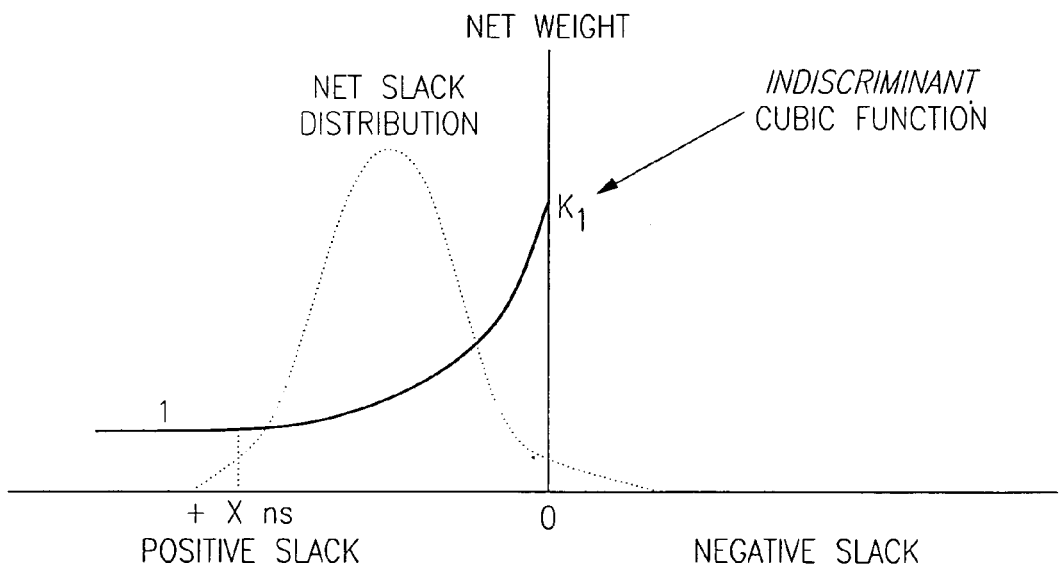
FIG. 15 illustrates the original mapping function which will be used to map the new 'virtual' timing net slack values into new lower netweights using the original mapping function.

This timing optimization will be used only to assign a new slack timing value to the nets and paths which received this timing optimization operation. These new timing values will be used to map the new net slacks to new lower netweights using the original mapping function (FIG. 15).

Figure 16:
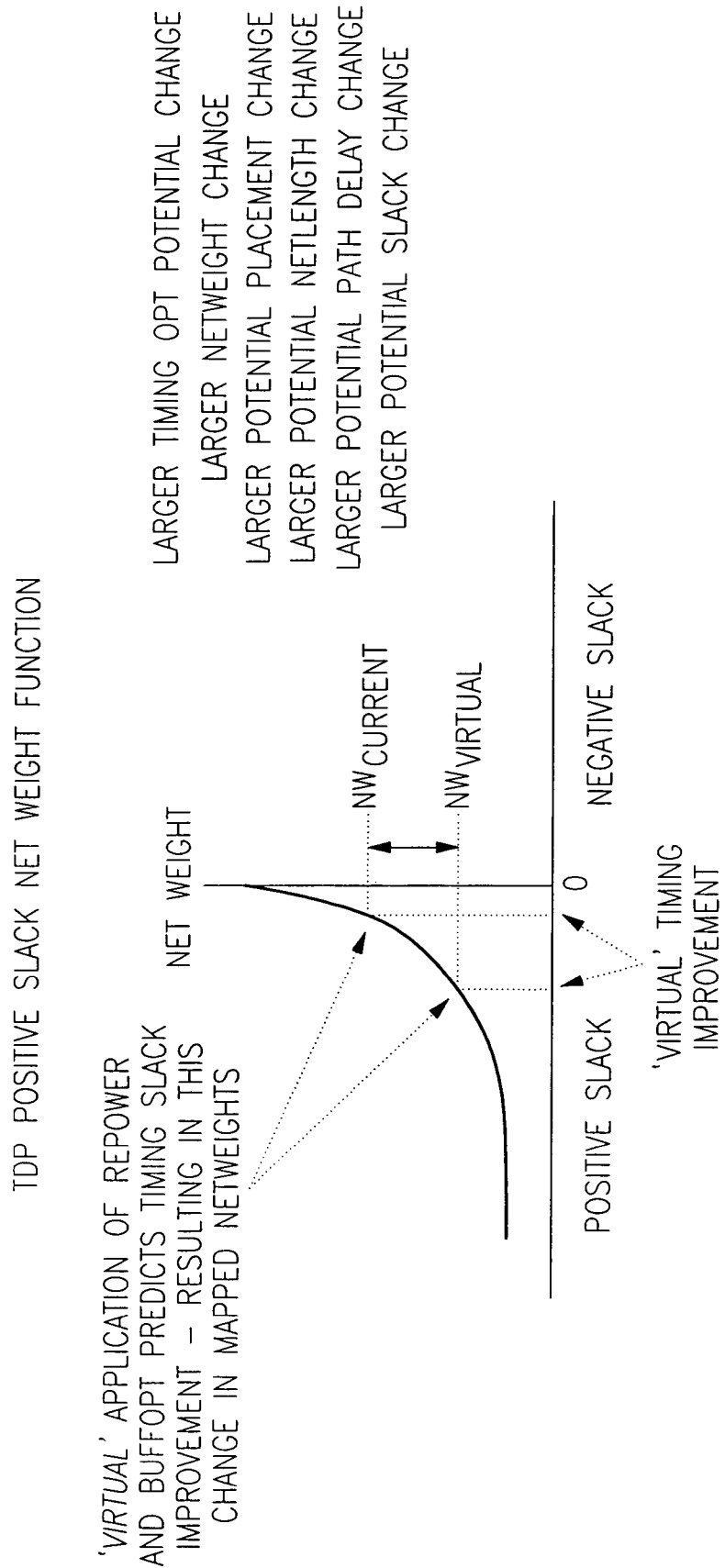
FIG. 16 illustrates one example of anticipating the differing time delay improvement potentials among various positive slack nets, so as to assign them corresponding priorities (netweights) for placement.

The idea here is to anticipate the differing time delay improvement potentials among various positive slack nets, so as to assign them corresponding priorities (netweights) for placement. These priorities, in turn, create placement behaviors complementing the time delay improvement potentials discovered earlier. In other words the netweights for some positive slack nets will be lowered to promote reduced congestion and to amplify the effect of negative slack net weights on placement behavior (FIG. 16).

Figure 17:
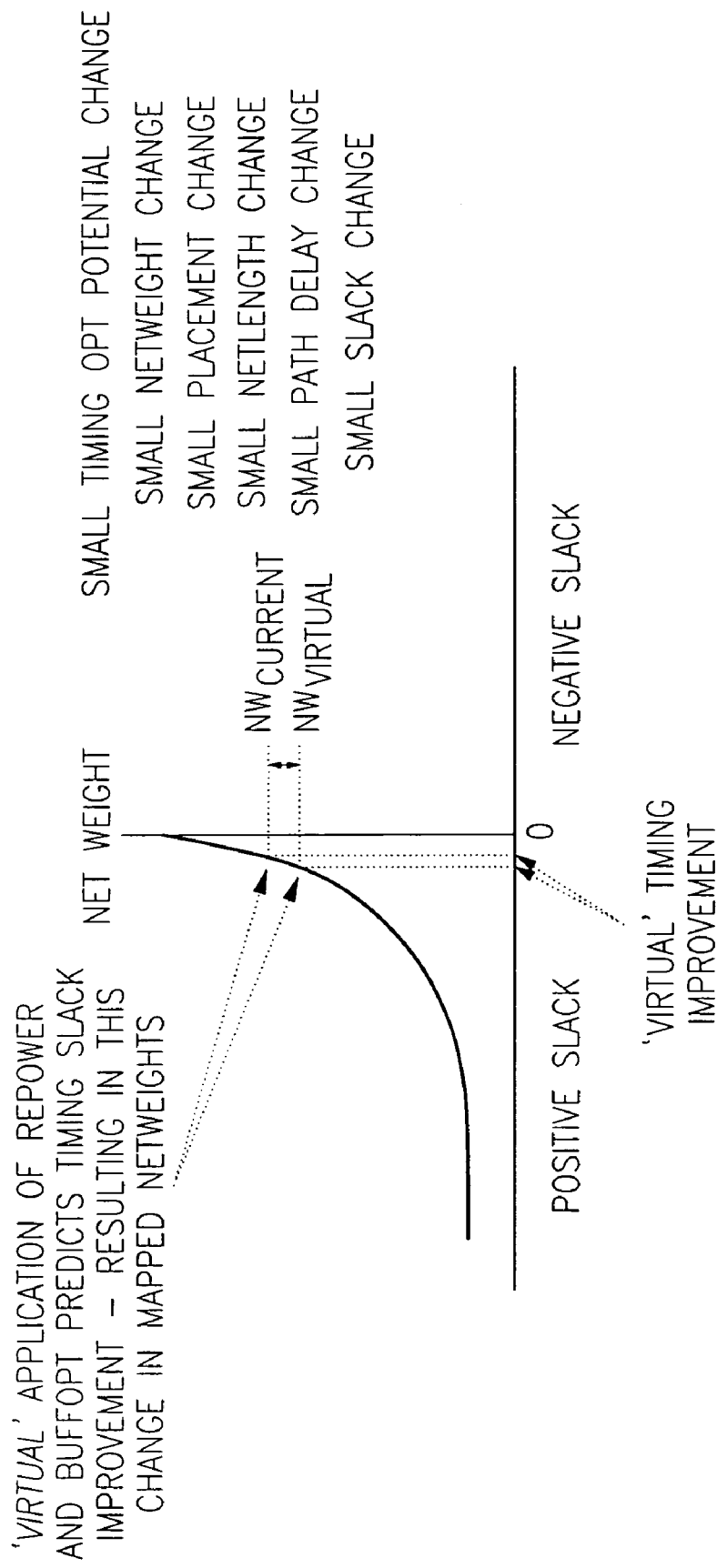
FIG. 17 illustrates another example wherein, if other positive slack paths and nets do not respond significantly to timing optimization techniques by increasing their positive slack margins, these nets will have their netweights mapped to marginally lower values.

If other positive slack paths and nets do not significantly respond to timing optimization techniques by increasing their positive slack margins, these nets will have their netweights mapped to marginally lower values (FIG. 17).

3. Combining the objectives in 1 and 2 above (minimize crossover and promote congestion mitigation)

This concept recognizes the fact that negative slack nets compete with positive slack nets in the placement equilibrium solution. In order to close timing, negative slack nets must contract to recover path delay. This contraction requires a reciprocal expansion of positive slack nets that interact with negative slack nets in the net connection matrix. The effect that negative slack net behavior has on positive slack nets is related to the logical proximity of those nets. Positive slack nets that are logically near (closely connected) to negative slack nets will be subjected to a greater influence on their expansion than positive slack nets which are 'remotely' related. As a result, it may be possible to lower the net weights for remotely related positive slack nets more than for proximate positive slack nets.

Figure 18:
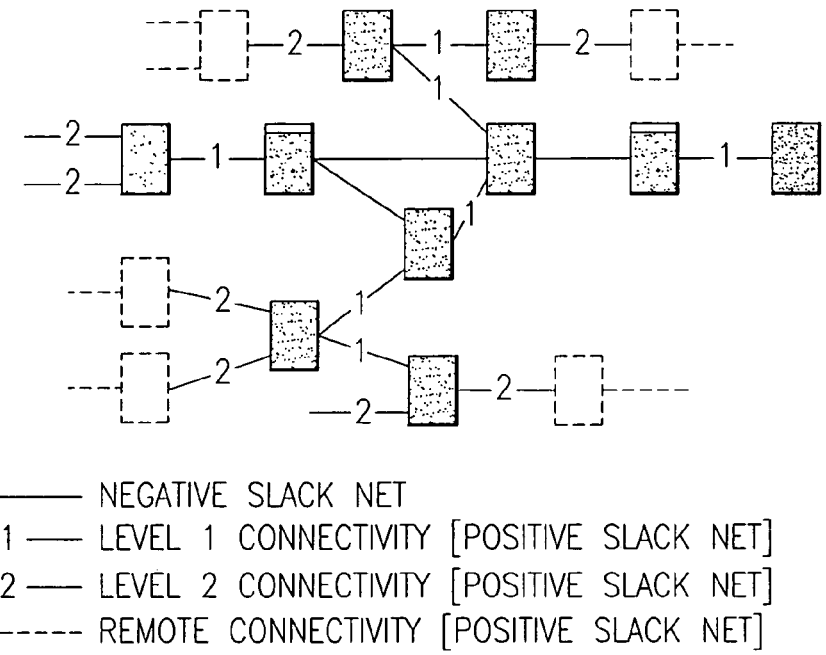
FIG. 18 illustrates one example of when two separate net groups are differentiated using a netlist trace to identify the data path nets within 'N' levels of each negative slack net.

To implement this idea, two separate net groups are differentiated using a netlist trace to identify the data path nets within 'N' levels of each negative slack net. An example where N=2 levels is shown in FIG. 18, in which:

Group #1 contains positive slack nets which are in logical proximity to negative slack nets. In other words they are members of the 'N' level trace Group #2 contains positive slack nets whose relationship (through the net connection matrix) to negative slack nets is 'remote'. This group consists of all of the data path nets in the design minus the members of the trace group (Group #1)

Figure 19:
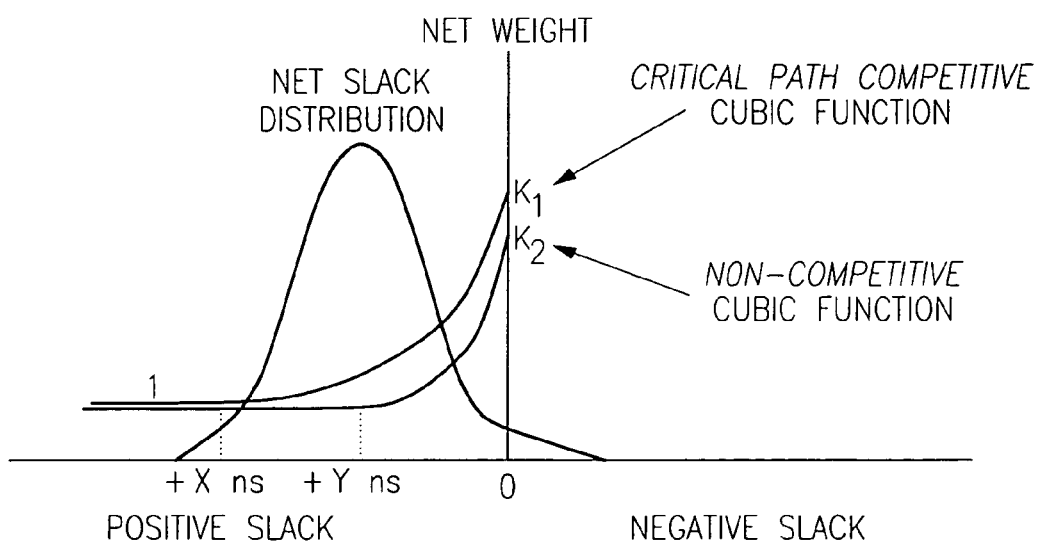
FIG. 19 illustrates an example of how netweight mapping is applied by means of assigning each net group to its own separate netweight mapping function.

Turning now to FIG. 19, the netweight mapping is applied by means of assigning each net group to its own separate netweight mapping function. Where the netweight function for Group #2 would map lower netweights than the mapping function for Group #1 for the same timing slack value. An example of a preferred embodiment might be the assignment of two different cubic functions for the two groups where the cubic function for Group #2 had lower values than the cubic function for Group #1 (FIG. 19).

The 'virtual' timing improvement projection operation from concept #2 above would be applied to all nets from both Group #1 and Group #2 whose slack fell within the slack range operated on by the timing improvement algorithm.

These congestion mitigation steps can be executed in a further revision to the current IBM Pisces methodology which was particularly described for FIGS. 1 through 9, this further revision being shown in FIG. 20. In FIG. 20, the Pisces methodology process with a step of accessing a netlist identifying circuit design connections, and then after assigning individual net weights to the nets in timing paths within the netlist irrespective of physical design parameters, determining composite net weight for nets in the timing paths within the net list in response to the plurality of individual net weights and determining the initial placement of the circuitry in response to the composite net weight. In the process we concurrently proceed to improve wireability of the design by additional timing optimization and net weight mapping modification steps. We calculate slack weight components based on a standard cubic curve. Then generate composite net weights, as mentioned, in response to the individual net weights.

We concurrently proceed to improve wireability of the design by improving wiring optimization potential. This new method introduces timing optimization of positive slack nets only after timing optimization of the negative slack nets only. Additionally a net differentiation decision is made as to whether or not the net is within N levels of the negative slack net for the positive slack nets. If yes, then we calculate slack weights components based on the standard cubic curve as in the current method, but if not we calculate the component net weight for nets in the timing path based on a reduced cubic curve.

Thereafter we generate the composite net weights, and determine the placement of circuitry in response to the composite net weight after concurrently proceeding to improve wireability of the design by the additional timing optimization and net weight mapping modification steps mentioned above.

The capabilities of the present invention can be implemented in software, firmware, hardware or some combination thereof.

As one example, one or more aspects of the present invention can be included in an article of manufacture (e.g., one or more computer program products) having, for instance, computer usable storage media. The media has embodied therein, for instance, computer readable program code means for providing and facilitating the capabilities of the present invention which can be performed as a service or design aid. The article of manufacture can be included as a part of a computer system or sold separately.

At least one program storage medium readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method performed for determining placement of circuitry during integrated circuit design, the method comprising:

accessing a net list identifying circuitry connections;

assigning a plurality of individual net weights to nets in timing paths within said net list, said individual net weights being valid irrespective of physical design parameters; wherein:

said individual net weights include a recoverability net weight proportional to an amount of non-optimizable delay in said timing paths, and said recoverability net weight is determined in response to a ratio of non-optimizable delay in said timing path to optimizable delay in said timing paths, and said individual net weights include a negative slack recoverability factor (NSRF) net weight proportional to a ratio of a negative slack path's total path delay adder due to interconnect to that negative slack path's zero wire load model positive slack margin, determining a composite net weight for nets in said timing paths, said composite net weight being in response to said plurality of individual net weights;

concurrently proceeding to improve wireability of said design by additional timing optimization and net weight mapping modification steps; and determining placement of said circuitry in response to said composite net weight.

2. The method of claim 1 wherein:

said individual net weights include a clock frequency net weight proportional to a clock frequency of said timing paths.

3. The method of claim 1 wherein:

said individual net weights include a slack availability net weight inversely proportion to placement available slack in said timing paths.

4. The method of claim 1 wherein:

said individual net weights include a net population net weight proportional to a number of nets in said timing paths, and said net population net weight is determined in response to a square root of said number of nets in said timing paths.

5. The method of claim 1 wherein optimal timing is preserved after improving wireability by said additional timing optimization and net weight mapping modification steps.

6. The method of claim 5 wherein said net weight mapping modification is achieved by applying timing optimization to a set of timing paths and their nets which lie within a selected positive slack range, and the resulting alteration in slack status for these nets is mapped to a new net weight value using a designated net weight mapping function.

7. The method of claim 5 wherein net weight mapping modification is achieved by differentiating nets into two groups based on whether they are nearby or remote in their logical proximity to negative slack critical path nets.

8. The method of claim 7 wherein separate net weight mapping functions are created for each of the differentiated net groups, with a lower valued mapping function assigned to the remote logic proximity group, and a higher valued mapping function assigned to the nearby logic proximity group.

* * * * *

Disclaimer

7,376,924—James J. Curtin, Fishkill, NY (US); Jose L. Neves, Poughkeepsie, NY (US); Douglas S. Search, Red Hook, NY (US). METHODS FOR PLACEMENT WHICH MAINTAIN OPTIMIZED BEHAVIOR, WHILE IMPROVING WIREABILITY POTENTIAL. Patent dated May 20, 2008. Disclaimer filed March 13, 2008, by the assignee, International Business Machines Corporation.

Hereby disclaims the terminal part of any patent granted on the above-identified application, which would extend beyond the expiration date of the full statutory term of serial number 12/047,382.

*(Official Gazette September 30, 2008)*